United States Patent
Spence (10) Patent No.: US 10,062,933 B2
(45) Date of Patent: Aug. 28, 2018

(54) HYDROMETALLURGICAL ELECTROWINNING OF LEAD FROM SPENT LEAD-ACID BATTERIES

(71) Applicant: Johnson Controls Technology Company, Plymouth, MI (US)

(72) Inventor: Matthew A. Spence, Lindenhurst, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 206 days.

(21) Appl. No.: 15/145,256

(22) Filed: May 3, 2016

(65) Prior Publication Data

US 2017/0170531 A1    Jun. 15, 2017

Related U.S. Application Data

(60) Provisional application No. 62/267,208, filed on Dec. 14, 2015.

(51) Int. Cl.

| | | |
|---|---|---|
| H01M 10/54 | (2006.01) | |
| C22B 3/00 | (2006.01) | |
| C25C 1/18 | (2006.01) | |
| C25C 7/00 | (2006.01) | |
| H01M 4/38 | (2006.01) | |
| H01M 4/56 | (2006.01) | |
| H01M 10/12 | (2006.01) | |

(52) U.S. Cl.
CPC .......... *H01M 10/54* (2013.01); *C22B 13/045* (2013.01); *C25C 1/18* (2013.01); *C25C 7/007* (2013.01); *H01M 4/38* (2013.01); *H01M 4/56* (2013.01); *H01M 10/12* (2013.01)

(58) Field of Classification Search
CPC .......... H01M 10/54; H01M 4/38; H01M 4/56; H01M 10/12; C22B 1/18; C25C 7/007
See application file for complete search history.

(56) References Cited

U.S. PATENT DOCUMENTS

| | | |
|---|---|---|
| 4,118,219 A | 10/1978 | Elmore et al. |
| 4,220,628 A | 9/1980 | Kolakowski |
| 4,269,811 A | 5/1981 | Striffler, Jr. |
| 4,336,236 A | 6/1982 | Kolakowski et al. |

(Continued)

FOREIGN PATENT DOCUMENTS

| | | |
|---|---|---|
| CA | 2141906 A1 | 4/1996 |
| CA | 2319285 A1 | 3/2002 |

(Continued)

OTHER PUBLICATIONS

PCT/US2016/044072 International Search Report and Written Opinion dated Nov. 10, 2016.

(Continued)

*Primary Examiner* — Helen Oi K Conley
(74) *Attorney, Agent, or Firm* — Fletcher Yoder, P.C.

(57) ABSTRACT

The present disclosure relates generally to recycling lead-acid batteries, and more specifically, relates to purifying and recycling the lead content from lead-acid batteries. A method includes reacting a lead-bearing material with a first carboxylate source to generate a first lead carboxylate. The method includes reacting the first lead carboxylate with a second carboxylate source to generate a second lead carboxylate. The method further includes applying an electrical bias to an aqueous solution of the second lead carboxylate to generate metallic lead.

22 Claims, 3 Drawing Sheets

(56) References Cited

U.S. PATENT DOCUMENTS

| | | |
|---|---|---|
| 4,416,743 A | 11/1983 | Holland |
| 5,292,456 A | 3/1994 | Francis et al. |
| 5,342,499 A | 8/1994 | Holbein et al. |
| 5,429,661 A | 7/1995 | Khodov et al. |
| 5,460,730 A | 10/1995 | Czerny et al. |
| 5,514,263 A | 5/1996 | Spijkerman et al. |
| 5,630,931 A | 5/1997 | Manequini |
| 5,690,718 A | 11/1997 | Sabin |
| 5,827,347 A | 10/1998 | Margulis |
| 5,840,262 A | 11/1998 | Margulis |
| 5,879,830 A | 3/1999 | Olper et al. |
| 5,944,869 A | 8/1999 | Modica et al. |
| 6,110,433 A | 8/2000 | Kleinsorgen et al. |
| 6,150,050 A | 11/2000 | Mathew et al. |
| 6,471,743 B1 | 10/2002 | Young et al. |
| 7,090,760 B2 | 8/2006 | Seo et al. |
| 7,498,012 B2 | 3/2009 | Olper et al. |
| 7,507,496 B1 | 3/2009 | Kinsbursky et al. |
| 7,608,178 B2 | 10/2009 | De Jonghe et al. |
| 7,713,502 B2 | 5/2010 | Koehler et al. |
| 7,772,452 B2 | 8/2010 | Modica |
| 7,799,294 B2 | 9/2010 | Kordosky et al. |
| 7,833,646 B2 | 11/2010 | Zenger et al. |
| 8,147,780 B2 | 4/2012 | Martini |
| 8,323,376 B2 | 12/2012 | Kumar et al. |
| 8,562,923 B1 | 10/2013 | Smith et al. |
| 2006/0239903 A1 | 10/2006 | Guerriero et al. |
| 2007/0028720 A1 | 2/2007 | Sommariva et al. |
| 2010/0040938 A1 | 2/2010 | Kumar |
| 2010/0043600 A1 | 2/2010 | Martini |
| 2010/0143219 A1 | 6/2010 | Chow |
| 2011/0129410 A1 | 6/2011 | Trindade |
| 2012/0186397 A1 | 7/2012 | Martini |
| 2013/0064743 A1 | 3/2013 | Laurin et al. |
| 2016/0294024 A1 | 10/2016 | Clarke et al. |
| 2016/0308261 A1 | 10/2016 | Tyagi et al. |

FOREIGN PATENT DOCUMENTS

| | | |
|---|---|---|
| CN | 1357938 | 7/2002 |
| CN | 1451771 | 10/2003 |
| CN | 1470675 | 1/2004 |
| CN | 1601805 | 3/2005 |
| CN | 1812183 | 8/2006 |
| CN | 101104887 | 1/2008 |
| CN | 101104890 | 1/2008 |
| CN | 101205080 | 6/2008 |
| CN | 201071389 | 6/2008 |
| CN | 101250720 | 8/2008 |
| CN | 101291008 | 10/2008 |
| CN | 101318692 | 12/2008 |
| CN | 101345328 | 1/2009 |
| CN | 101414698 | 4/2009 |
| CN | 101488597 | 7/2009 |
| CN | 101514395 | 8/2009 |
| CN | 101540395 | 9/2009 |
| CN | 101608264 | 12/2009 |
| CN | 101613803 | 12/2009 |
| CN | 101615707 | 12/2009 |
| CN | 101748277 | 6/2010 |
| CN | 101759158 | 6/2010 |
| CN | 101771181 | 7/2010 |
| CN | 101792176 | 8/2010 |
| CN | 101831668 | 9/2010 |
| CN | 101899576 | 12/2010 |
| CN | 101994007 | 3/2011 |
| CN | 102020374 | 4/2011 |
| CN | 102020375 | 4/2011 |
| CN | 102031380 | 4/2011 |
| CN | 102162034 | 8/2011 |
| CN | 102306855 | 1/2012 |
| CN | 102306856 | 1/2012 |
| CN | 102351217 | 2/2012 |
| CN | 102396099 | 3/2012 |
| CN | 102427149 | 4/2012 |
| CN | 202285265 | 6/2012 |
| CN | 102560122 | 7/2012 |
| CN | 102560535 | 7/2012 |
| CN | 103050745 | 4/2013 |
| CN | 103882474 | 6/2014 |
| DE | 69905134 T2 | 10/2003 |
| EP | 0905810 A2 | 3/1999 |
| EP | 1656463 A1 | 5/2006 |
| EP | 1684369 A1 | 7/2006 |
| EP | 1728764 A1 | 12/2006 |
| EP | 2182569 A1 | 5/2010 |
| EP | 2312686 A1 | 4/2011 |
| EP | 2333895 A1 | 6/2011 |
| EP | 2450991 A1 | 5/2012 |
| EP | 2604711 A1 | 6/2013 |
| JP | H10162868 | 6/1998 |
| RU | 2298044 C2 | 4/2007 |
| RU | 2302059 C1 | 6/2007 |
| TW | 391986 | 6/2000 |
| TW | 200937702 | 9/2009 |
| WO | WO0121846 A1 | 3/2001 |
| WO | WO03025235 A1 | 3/2003 |
| WO | WO2005007904 A1 | 1/2005 |
| WO | WO2008047956 A1 | 4/2008 |
| WO | WO2008056125 A1 | 5/2008 |
| WO | WO2008087684 A1 | 7/2008 |
| WO | WO2011138996 A1 | 11/2011 |
| WO | 2015057189 | 4/2015 |

OTHER PUBLICATIONS

Zhu, Xinfeng; Leaching of Spent Lead Acid Battery Paste Components by Sodium Citrate and Acetic Acid; Journal of Hazardous Materials, Feb. 19, 2013; pp. 387-396.

International Search Report and Written Opinion for PCT Application No. PCT/US2015/034758 dated Dec. 23, 2015.

International Search Report and Written Opinion for PCT Application No. PCT/US2015/034694 dated Dec. 23, 2015.

International Search Report and Written Opinion for PCT Application No. PCT/US2015/034761 dated Dec. 23, 2015.

International Search Report and Written Opinion for PCT Application No. PCT/US2015/034717 dated Dec. 23, 2015.

PCT International Search Report and Written Opinion for Application No. PCT/US2015/035257 dated Sep. 2, 2015.

HYDROMETALLURGICAL ELECTROWINNING OF LEAD FROM SPENT LEAD-ACID BATTERIES

CROSS-REFERENCE

This application claims priority from and the benefit of U.S. Provisional Application Ser. No. 62/267,208, entitled "HYDROMETALLURGICAL ELECTROWINNING OF LEAD FROM SCRAP LEAD ACID BATTERIES," filed Dec. 14, 2015, which is hereby incorporated by reference in its entirety for all purposes. This application is also related to U.S. application Ser. No. 14/498,748, entitled "METHODS FOR PURIFYING AND RECYCLING LEAD FROM SPENT LEAD-ACID BATTERIES," filed Sep. 26, 2014; to U.S. application Ser. No. 14/498,771, entitled "SYSTEMS AND METHODS FOR PURIFYING AND RECYCLING LEAD FROM SPENT LEAD-ACID BATTERIES," filed Sep. 26, 2014; to U.S. application Ser. No. 14/498,798, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES," filed Sep. 26, 2014; and to U.S. application Ser. No. 14/586,111, entitled "SYSTEMS AND METHODS FOR THE HYDROMETALLURGICAL RECOVERY OF LEAD FROM SPENT LEAD-ACID BATTERIES AND THE PREPARATION OF LEAD OXIDE FOR USE IN NEW LEAD-ACID BATTERIES," filed Dec. 30, 2014, which are hereby incorporated by reference in their entirety for all purposes

BACKGROUND

The present disclosure relates generally to systems and methods for recycling lead-acid batteries, and more specifically, relates to the hydrometallurgical recycling the lead content from lead-acid batteries.

The lead present in a lead-acid battery may be in a number of forms. For example, a lead-acid battery may include grids, plates or spines of lead or lead alloys, battery paste that contains metallic lead sponge, lead oxides, and/or lead sulfates, and posts and/or interconnects that contain metallic lead and/or lead alloys. While it may be desirable to attempt to recover lead from the waste of spent or retired lead-acid batteries, this material may include a variety of lead compounds (e.g., lead alloys, oxides, sulfates and carbonates) and an array of physical and/or chemical impurities. Existing methods for purifying lead typically rely almost entirely on multi-stage pyrometallurgical smelting, in which some of these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process. For the construction of new lead-acid batteries, the resulting refined lead should have purity in excess of 99% Pb. This highly refined metallic lead may be directly used, or modified to produce lead alloys and/or lead compounds that may be used, to manufacture components of new lead-acid batteries.

SUMMARY

The present disclosure relates to systems and methods by which lead from spent lead-acid batteries may be extracted, purified, and used in the construction of new lead-acid batteries. In an embodiment, a method includes reacting a lead-bearing material with a first carboxylate source to generate a first lead carboxylate. The method includes reacting the first lead carboxylate with a second carboxylate source to generate a second lead carboxylate. The method further includes applying an electrical bias to an aqueous solution of the second lead carboxylate to generate metallic lead.

In another embodiment, a lead recovery system includes a first reactor configured to receive and mix a lead-bearing material and a first carboxylate source to yield a first mixture, wherein the first mixture includes a first lead carboxylate that is dissolved in a liquid component of the first mixture. The system also includes a second reactor configured to receive and mix the liquid component of the first mixture and a second carboxylate source to yield a second mixture, wherein the second mixture includes solid particles of a second lead carboxylate. The system further includes a third reactor configured to receive the solid particles of the second lead carboxylate, dissolve and/or suspend the solid particles of the second lead carboxylate to generate a third mixture, and apply an electrical bias to the third mixture to generate metallic lead.

In another embodiment, a method includes processing spent lead-acid batteries to generate a lead-bearing material, and leaching the lead-bearing material using a first carboxylate source to generate a leaching mixture, wherein the leaching mixture includes a dissolved first lead carboxylate. The method includes separating unleached solids from a liquid component of the leaching mixture, and mixing the liquid component of the leaching mixture with a second carboxylate source to generate a carboxylate exchange mixture, wherein the carboxylate exchange mixture includes solid particles of a second lead carboxylate. The method also includes separating the solid particles of the second lead carboxylate from a liquid component of the carboxylate exchange mixture. The method further includes generating an aqueous solution from the solid particles of the second lead carboxylate, and applying an electrical bias to the aqueous solution of the second lead carboxylate to generate metallic lead.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the unmodified term "lead", should be interpreted to encompass all forms of lead, including metallic lead, lead alloys, lead compounds, and mixtures thereof. For distinction, metallic lead (i.e., Pb(0)) may be referred to herein using the terms elemental lead, metallic lead, or free lead. As used herein, the term "substantially free" may be used to indicate that the identified component is not present at all, or is only present in a trace amount (e.g., less than 0.1%, less than 0.01%, or less than 0.001%). As used herein, a "carboxylate source" is any molecule or polymer that includes at least one carboxylate or carboxylic acid moiety or functionality. Accordingly, a non-limiting list of example carboxylate sources include: citrate, acetate, formic acid, formate, lactate, dilactate, oxalate, tartarate, or any combination thereof. The term "citrate" or "citrate source" herein refers to citric acid or a citrate salt (e.g., sodium citrate or ammonium citrate). The term "acetate" or "acetate source" herein refers to acetic acid or acetate salts (e.g., sodium acetate, ammonium acetate). "New lead-acid battery" herein refers to a newly produced lead-acid battery, while the term "spent lead-acid battery" indicates a battery at the end of its useable service life. As used herein "peroxide" refers to hydrogen peroxide and/or any organic peroxide (e.g. peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof. As used herein, an "antisolvent" is a solvent that may be added to a solution to facilitate the precipitation of a solute from a solution.

As mentioned above, existing methods of lead recovery typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion byproducts (e.g., $SO_2$, soot) may be restricted by local environmental regulations, present embodiments are directed toward enabling a solution-based (e.g., hydrometallurgical) removal of several impurities from the recovered lead, thereby avoiding or reducing the formation of such combustion byproducts and/or the cost associated with scrubbing them from the exhaust stream.

As discussed in detail below, present embodiments address limitations of other waste lead purification techniques, enabling a robust technique for purifying and recycling of recovered lead on an industrial scale. In particular, present embodiments involve hydrometallurgical recovery of lead from spent lead-acid batteries using a three-step process involving two different carboxylate sources: a first carboxylate source (e.g., an acetate) that forms a first lead carboxylate salt that is sufficiently soluble in the leaching medium to enable separation from unleached solids, and a second carboxylate source (e.g., a citrate) that exchanges with the first carboxylate source in a subsequent reaction to form an insoluble second lead carboxylate salt that may be isolated after precipitation. Additionally, present embodiments enable the electrowinning of pure metallic lead from a solution of the second lead carboxylate (e.g., lead citrate) in the final step of the recovery process. In addition to being suitable for the construction of new lead-acid batteries, it may be appreciated that the metallic lead produced by the presently disclosed system and method is sufficiently pure for more lead applications that are more sensitive to the presence of impurities, such as semiconductor manufacturing. Further, present embodiments enable the recycling of various reagents (e.g., acetate, citrate, hydroxide, antisolvent) during the lead recovery and purification process, which reduces both waste production and operational costs. In addition, the process also enables the capture of byproducts as solids, reducing water treatment cost and yielding other potential products (i.e. sodium sulfate, ammonium sulfate).

Figure 1:
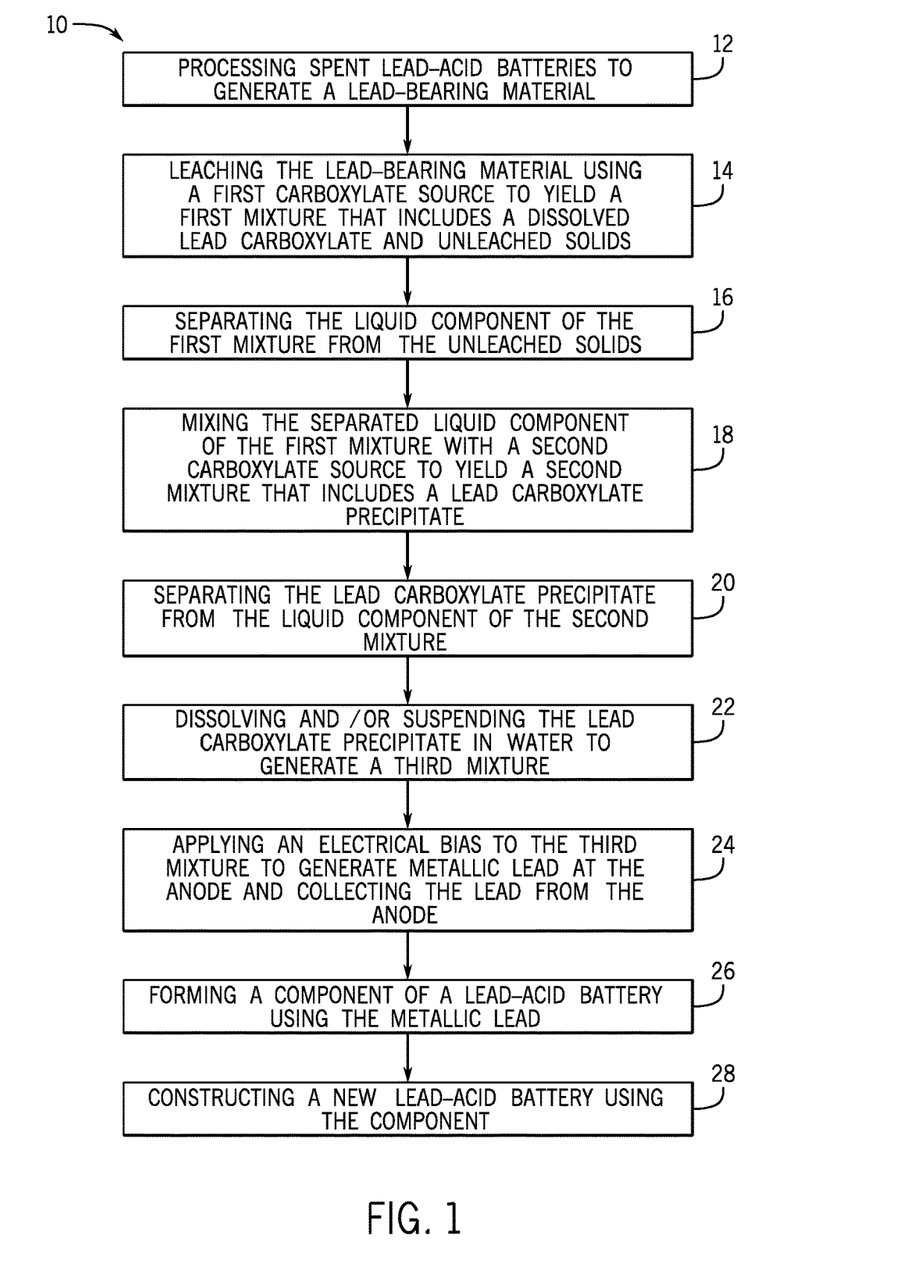
FIG. 1 is a flow diagram illustrating a process by which lead from spent lead-acid batteries may be extracted, purified, and used in the construction of new lead-acid batteries, in accordance with embodiments of the present approach.

FIG. 1 is a flow diagram illustrating an embodiment of a process 10 by which lead from spent lead-acid batteries may be extracted, purified, and used in the construction of new lead-acid batteries. It may be appreciated that the process 10 of FIG. 1 is merely provided as an example and, in other embodiments, the process 10 may include additional purification steps (e.g., additional hydrometallurgical purification steps, additional phase-, size- or density-based separation steps, additional pH adjustment steps), in accordance with the present disclosure. As illustrated in FIG. 1, the process 10 begins with the processing (block 12) of spent lead-acid batteries to generate a lead-bearing material. For example, in an embodiment, one or more lead-acid batteries may be fed through a hammer mill or another suitable device that is capable of crushing, pulverizing, grinding or otherwise physically digesting the entirety of the spent lead-acid battery. The components of the spent lead-acid battery may include, for example, metal posts, metal connectors, metal grids, carbon black, glass, a plastic or metal casing, plastic separators, plastic fibers, lignosulphonates or other organic expanders, battery paste (e.g., including various lead oxides, lead carbonates, lead sulfates), sulfuric acid, among other components (e.g., non-lead-based metal components, such as brass terminals). Accordingly, the lead present in the spent lead-acid battery may be in a number of different forms, including, for example, $PbO_2$, $PbO$, $PbSO_4$, $PbCO_3$, $Pb(0)$, and various lead alloys.

After being substantially pulverized, the resulting battery waste may, in certain embodiments, be passed through one or more preliminary purification steps in which certain components (e.g., the crushed plastic components) may be removed from the remainder of the lead-bearing mixture, for example, using a separation device (e.g., a settling tank or cyclone separator) that takes advantage of the lower density of these plastic components. For example, in certain embodiments, sieving may be applied as a separation step to separate massive metal particle fractions from other portions of the battery waste. Further, in certain embodiments, some, or all, of the residual sulfuric acid entrained in the lead-bearing material may be recycled for reuse, or neutralized and crystallized as a solid sulfate for disposal or resale. In certain embodiments, pre-treatment of the lead-bearing material may include a full or partial desulfurization stage in which the sulfate content of the lead-bearing material may be reduced by chemical means, for example, by treatment with hydroxide (e.g., sodium hydroxide) or carbonate (e.g., soda ash). Each of these actions or steps may be generally represented by block 12.

The illustrated method 10 continues with leaching (block 14) the lead-bearing material generated in block 12 (which may include all of the battery waste, or a separated fraction thereof, as discussed above) using a first carboxylate source to yield a first mixture (e.g., a leaching mixture) that includes a dissolved lead carboxylate and unleached solids. In certain embodiments, the first carboxylate source may be an acetate or formate, or any other suitable carboxylate source that may drive the formation of lead salts that are generally soluble in the leaching mixture. Additionally, the pH of the leaching mixture may be increased (e.g., above 7 or more) using hydroxide to encourage leaching of the solid lead and dissolution of lead salts (e.g., lead acetate) in the leaching mixture. Furthermore, a reducing agent (e.g., peroxide, sodium metabisulfite, sulfur dioxide) may be added to the leaching mixture as well to facilitate the conversion of $PbO_2$ into a soluble $Pb^{2+}$ species. It is presently recognized that the ammonium ion (e.g., introduced into the leaching mixture as ammonium hydroxide or formed in situ from ammonia gas), is capable of forming lead complexes that further encourage the leaching of lead sulfates that may be present in the leaching mixture.

Subsequently, the liquid component of the leaching mixture may be separated (block 16) from unleached solids present in the mixture. The unleached solids may predominantly include residual metallic lead pieces from solid battery parts (e.g., terminals, connectors, grids), composed of a lead alloy that may include lead, antimony, arsenic, selenium, calcium, tin, silver, cadmium, or a combination thereof. Additionally, the unleached solid may, in certain embodiments, also include small residual particles (e.g., barium sulfate, carbon black, glass, polymer) from the processing of the battery in block 12. These unleached solids may be returned to the leaching vessel for further leaching or fed into other treatment systems (e.g., simple remelting or pyrometallurgical refining systems), in accordance with embodiments of the present disclosure. In certain embodiments, when the unleached solids are mostly or entirely metallic lead and lead alloys, the unleached solids may be remelted and used in the manufacture of a new lead-acid battery without further purification (e.g., smelting).

The liquid component of the leaching mixture isolated in block 16, which includes the dissolved lead salts (e.g., lead acetate) and various soluble impurities (e.g., ammonium sulfate, sodium sulfate), is subsequently mixed (block 18) with a second carboxylate source to yield a second mixture (e.g., a carboxylate exchange mixture) that includes a solid lead carboxylate precipitate. The second carboxylate source may be a citrate or another suitable carboxylate source capable of reacting with the first, dissolved lead carboxylate (e.g., lead acetate) in the carboxylate exchange mixture to form a second lead carboxylate (e.g., lead citrate) that has limited solubility in, and therefore precipitates from, the carboxylate exchange mixture. In certain embodiments, an acid (e.g., citric acid) may be added to lower the pH (e.g., below 7) to encourage precipitation of the second lead carboxylate (e.g., lead citrate) product from the carboxylate exchange mixture.

Subsequently, the second lead carboxylate precipitate may be separated (block 20) from the liquid component of the carboxylate exchange mixture. The second lead carboxylate (e.g., lead citrate) isolated in block 20 may be dissolved and/or suspended (block 22) in water to generate a third mixture (e.g., an electrowinning solution/suspension). An electrical bias is subsequently applied (block 24) to the third mixture using a cathode and anode (e.g., lead or graphite) such that pure metallic lead is electrowon from the third mixture at the surface of the anode, and then the electrowon lead may be collected (e.g., harvested, separated, removed) from the anode.

In certain embodiments, the electrowinning of block 24 may be performed in batches, or may be performed in a continuous fashion. The electrowinning conditions (e.g., voltage, current, concentration of the second lead carboxylate, temperature, pH, stirring rate, etc.) may be monitored and controlled to improve the efficiency of the recovery of the metallic lead. For example, in certain embodiments, the pH of the third (electrowinning) mixture may be controlled (e.g., using hydroxide) to increase the pH above approximately 8 (e.g., to 8.5, 9, 9.5, 10, 10.5, 11, or more), which improves the solubility of the second lead carboxylate within the third (electrowinning) mixture. As such, it may be appreciated that the disclosed electrowinning process can enable the recovery of lead from spent lead-acid batteries in a manner that affords a higher recovery rate and lower operational cost, while also avoiding the troublesome fumes, with respect to traditional lead recovery methods. Furthermore, it is presently contemplated that, in other embodiments, metallic lead could be electrowon from other solutions generated during the process 10 illustrated in FIG. 1 (e.g., the liquid component of the leaching mixture of block 14, the carboxylate exchange mixture of block 18). However, it is presently recognized that the process 10 illustrated in FIG. 1, which generally involves leaching with a first carboxylate source, exchanging with a second carboxylate source, and then electrowinning a solution of the second carboxylate source, enables the recovery of high-purity metallic lead that may be useful for numerous manufacturing applications in an especially efficient, cost-effective, and controllable manner.

The illustrated process 10 concludes with the metallic lead being formed (block 26) into a component of a lead-acid battery, and a new lead-acid battery being constructed (block 28) using the component. For example, in certain embodiments, one or more alloying metals (e.g., antimony, arsenic, selenium, calcium, tin, silver, cadmium) may be added to the metallic lead electrowon in block 24 to form a lead alloy, and the lead alloy may be shaped into components (e.g., grids, terminals, straps) of a lead-acid battery. In other embodiments, the metallic lead may be chemically modified (e.g., oxidized) to generate lead compounds (e.g., lead oxide) that provide other components (e.g., active materials) for a new lead-acid battery.

Table 1 illustrates the compositions of different types of metallic lead as determined by inductively coupled plasma atomic emission spectroscopy (ICP-AES). More specifically, E1 and E2 of Table 1 represent two different runs of the presently disclosed method of recovering metallic lead from spent lead-acid batteries, as illustrated in FIG. 1. For comparison, C1 (i.e., Corroding lead specification, MS-08012-E rev 21) and C2 (i.e., Corroding lead specification, Americas 7.1.5b) represent primary lead specifications defining the composition of metallic lead used for particular applications, such as for generating lead oxide active materials for constructing lead-acid batteries. As illustrated in Table 1, E1 and E2 generally include less than or equal amounts of impurities as specified by C1 or C2. For example, in certain embodiments, present embodiments enable the recovery of metallic lead including comparable levels of certain elements (e.g., Ca, Fe, Ni, Pt, S, Sn, Zn) with respect to C1 or C2 (e.g., within approximately 5% to approximately 10% of C1/C2). In certain embodiments, present embodiments enable the recovery of metallic lead including substantially lower levels of certain elements (e.g., Ag, Al, Ar, Bi, Cd, Co, Cr, Cu, Mn, Sb, Se, Te) with respect to C1 or C2 (e.g., approximately 5% to approximately 95% lower that C1/C2). By specific example, the bismuth content specified by C1 and C2 is 300 parts per million (ppm), and with traditional purification methods, it is exceedingly difficult to obtain primary lead having less than about 150 ppm of bismuth. By comparison, present embodiments enable the recovery of metallic lead having exceedingly low bismuth content (e.g., less than approximately 100 ppm, less than approximately 50 ppm, less than approximately 25 ppm, less than approximately 10 ppm). As such, it may be appreciated that the metallic lead recovered using the disclosed technique may be of sufficient purity for specialized applications (e.g., semiconductor fabrication). It may further be appreciated that certain metallic impurities (e.g., Te, Mn, Fe, Cr, Co), when present in the active material of a lead-acid battery, can activate side reactions that undesirably result in self-discharge and/or hydrogen outgassing within the lead-acid battery. Accordingly, the high-purity metallic lead that is recovered using the presently disclosed technique enables the manufacture of new lead-acid batteries that experience substantially less (e.g., little or no) self-discharge or hydrogen outgassing, and therefore, enable the production of new lead-acid batteries having superior electrical performance and battery life than is achievable using other types of lead (e.g., C1 and C2).

TABLE 1

Composition of the metallic lead as determined by inductively coupled plasma atomic emission spectroscopy (ICP-AES) with values indicated in parts per million (ppm). E1 and E2 represent two different runs of the presently disclosed method. C1 and C2 are specifications defining the purity of metallic lead for different applications. NS indicates that the element is not specified by the specification.

|  |  | E1 | E2 | C1 | C2 |
|---|---|---|---|---|---|
| Silver | Ag | 17 | 18 | 70 | 70 |
| Aluminum | Al | 3 | 2 | 5 | 10 |
| Arsenic | As | <1 | <1 | 5 | 5 |
| Barium | Ba | 2 | 2 | 5 | 5 |
| Bismuth | Bi | 6 | 6 | 300 | 300 |
| Calcium | Ca | 20 | 14 | NS | 20 |
| Cadmium | Cd | <1 | <1 | 5 | 5 |
| Cobalt | Co | <1 | <1 | 2 | 2 |
| Chromium | Cr | <1 | <1 | 5 | 5 |
| Copper | Cu | 10 | 10 | 15 | 15 |
| Iron | Fe | 15 | 15 | 5 | 5 |
| Manganese | Mn | <1 | <1 | 1 | 1 |
| Sodium | Na | 484 | 447 | NS | NS |
| Nickel | Ni | 4 | 4 | 2 | 2 |
| Platinum | Pt | <1 | <1 | 0.5 | NS |
| Rhenium | Re | <1 | <1 | NS | NS |
| Sulfur | S | 29 | 30 | 20 | 20 |
| Antimony | Sb | 6 | 3 | 7 | 7 |
| Selenium | Se | <1 | <1 | 2 | 2 |
| Tin | Sn | 26 | 19 | 20 | 20 |
| Strontium | Sr | 1 | 1 | NS | NS |
| Tellurium | Te | <1 | <1 | 2 | 1 |
| Zinc | Zn | 10 | 8 | 10 | 10 |

Figure 2:
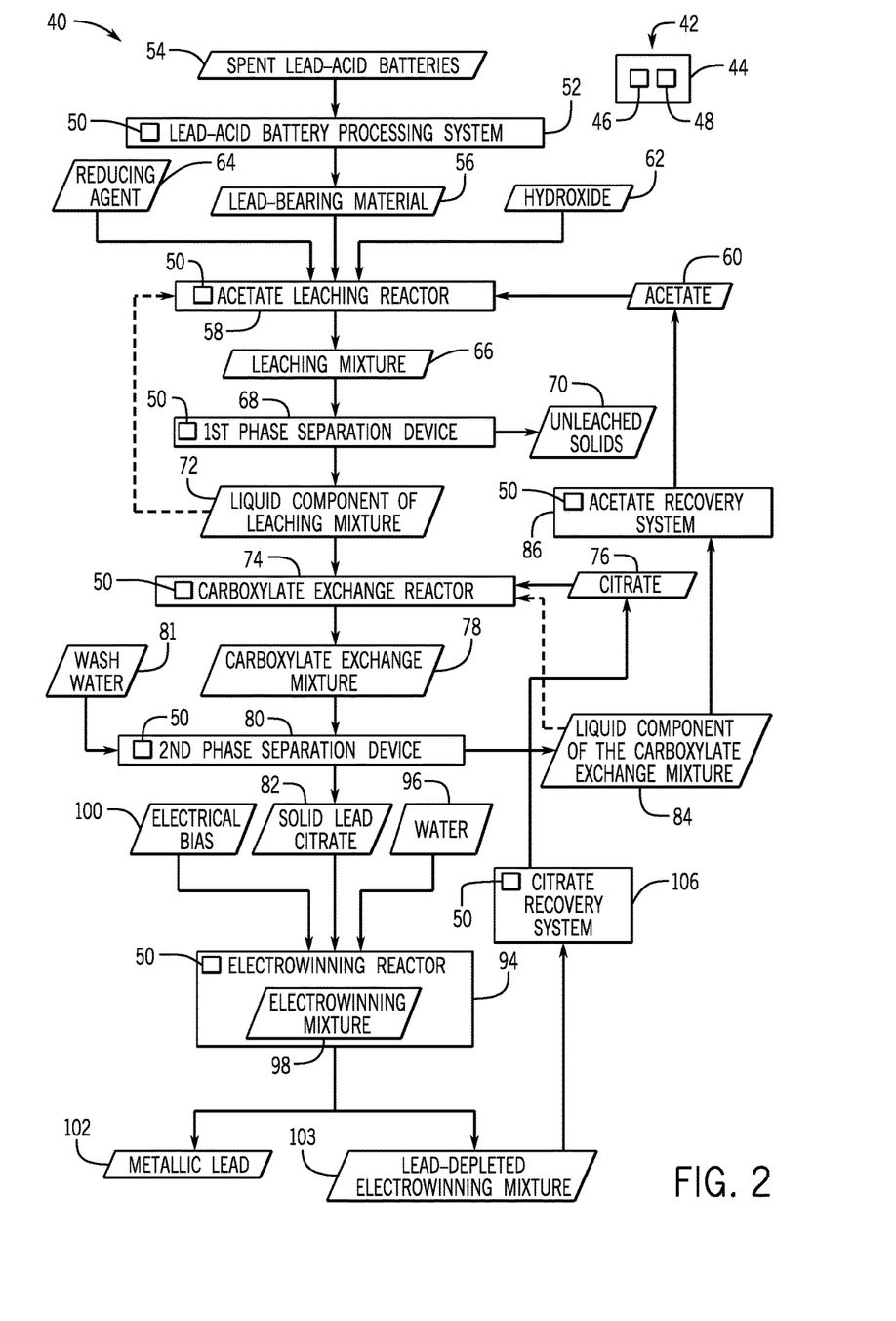
FIG. 2 is a schematic of a lead recovery system, in accordance with embodiments of the present approach.

FIG. 2 illustrates an embodiment of a lead recovery system 40 configured to perform a portion of the process illustrated in FIG. 1 in what may be referred to as a continuous manner. In certain embodiments, some or all of the illustrated lead recovery system 40 may be implemented as a multi-stage reactor system, or a series of individual reactors, that include phase separation devices disposed between certain stages or reactors in the lead recovery system 40 to enable the continuous processing of spent lead-acid batteries into electrowon metallic lead. In addition to these devices, stages, and/or reactors (illustrated as rectangles) in the lead recovery system 40, FIG. 2 also illustrates the various inputs and outputs (illustrated as parallelograms) for each device in the lead recovery system 40.

Further, the illustrated lead recovery system 40 of FIG. 2 has a control system 42 that includes a controller 44 (e.g., a programmable logic controller (PLC)). The controller 44 includes a memory 46 and a processor 48, which enable the controller 44 to store and execute instructions (e.g., applications, modules, apps, firmware) to control operation of the lead recovery system 40. For example, the lead recovery system 40 may include any number of sensing field devices 50 (e.g., temperature sensors, pressure sensors, flow rate sensors, oxygen sensors, rotational speed sensors, pH sensors) that are disposed throughout the lead recovery system 40 and are communicatively coupled to the controller 44 (e.g., via a wired or wireless communication channel) to enable the controller 44 to determine the operational parameters of the lead recovery system 40. Further, the controller 44 may be communicatively coupled to one or more control field devices 50 (e.g., actuators, valves, motors, pumps, screws, heating elements, compressors) configured to receive control signals from the controller 44 and modulate their operation or state accordingly.

With the foregoing in mind, the lead recovery system 40 illustrated in FIG. 2 includes a lead-acid battery processing system 52 that receives spent lead-acid batteries 54 and generates a lead-bearing material 56. As such, the lead-acid battery processing system 52 performs the acts described by block 12 of the process 10 illustrated in FIG. 1. As mentioned above, the lead-acid battery processing system 52 illustrated in FIG. 2 may include a hammer mill or another suitable device that is capable of receiving partial or entire lead-acid batteries (e.g., via a feed chute) and grinding the lead-acid batteries into pulverized battery materials. Additionally, as mentioned above, the lead-acid battery processing system 52 may include some preliminary separation or purification features to remove one or more components from the pulverized battery materials. For example, in certain embodiments, the spent lead-acid battery processing system 52 may include a magnet, to remove iron and steel pieces, and/or a cyclone separation device may separate lower density spent battery components (e.g., plastic components from the housing of the lead-acid batteries) from the higher-density lead-bearing material 56, which may subsequently be advanced to the next device (e.g., acetate leaching reaction 58) in the illustrated lead recovery system 40.

For the embodiment of the lead recovery system 40 illustrated in FIG. 2, the acetate leaching reactor 58 may be a leaching reactor or leaching tank that performs the acts described by block 14 of the process 10 illustrated in FIG. 1. In addition to the lead-bearing material 56 received from the lead-acid battery processing system 52, the illustrated acetate leaching reactor 58 receives a supply of acetate 60, which serves as the first carboxylate source for the example system 40. The illustrated acetate leaching reactor 58 also receives a feed of reducing agent 64 (e.g., peroxide, sodium metabisulfite, sulfur dioxide) to facilitate the conversion of $PbO_2$ into a soluble $Pb^{2+}$ species. The illustrated acetate leaching reactor 58 receives a supply of hydroxide 62 in order to maintain a high (basic) pH (e.g. pH greater than 7). Additionally, the illustrated acetate leaching reactor 58 is capable of heating the resulting leaching mixture 66 to provide temperatures ranging from approximately room temperature (e.g., 30° C.) up to the boiling point (e.g., 100° C.) of the leaching mixture 66. Further, in order to facilitate the leaching process, in certain embodiments, the rate at which the lead-bearing material 56, the hydroxide 62, the reducing agent 64, as well as other feeds (e.g., water), are added into the acetate leaching reactor 58 may be controlled by the controller 44 to maintain particular solid-to-liquid ratios (e.g., approximately 1:5 to approximately 1:10) in the leaching mixture 66. That is, it is presently recognized that maintaining a solid-to-liquid ratio in this range improves the leaching of the lead-bearing material 56 by providing sufficient mobility and/or fluidity within the leaching mixture 66.

The lead recovery system 40 illustrated in FIG. 2 includes a first phase separation device 68 that is configured to perform the acts described in block 16 of the process 10 illustrated in FIG. 1. In certain embodiments, the first phase separation device 68 may include a filter press, a clarifier with or without precipitation means, a cyclone separator, a settling tank, a drying belt, a spray drier, a cyclonic separator, a settling tank, or any other device or combination of devices capable of separating components of the leaching mixture 66 based on particle size, solubility, and/or density. As such, the first phase separation device 68 receives the leaching mixture 66 and separates the unleached solids 70 from the liquid component 72 of the received leaching mixture 66. As set forth above, these unleached solids 70 may include, for example, residual pieces of lead or lead alloys (e.g., grid metal), which may advance to other purification techniques or systems (e.g., re-melt or pyrometallurgical purification systems), in accordance with the present disclosure. The isolated liquid component 72, which includes dissolved lead acetate and possibly other soluble impurities, may subsequently be advanced to the next device (e.g., carboxylate exchange reactor 74) in the illustrated lead recovery system 40. As illustrated by the dashed line 69, in certain embodiments, a portion of the liquid component 72 of the leaching mixture 66 may be recirculated back to the acetate leaching reactor 58 to facilitate further leaching of the lead-bearing material 56.

The lead recovery system 40 illustrated in FIG. 2 includes a carboxylate exchange reactor 74 that is configured to perform the acts described in block 18 of the process 10 illustrated in FIG. 1. As such, the carboxylate exchange reactor 74 illustrated in FIG. 2 is a reactor or vessel capable of receiving the separated liquid component 72 of the leaching mixture 66. The illustrated carboxylate exchange reactor 74 also receives and mixes in a citrate 76, which acts as the second carboxylate source for the example lead recovery system 40, to yield the carboxylate exchange mixture 78 that includes solid lead citrate 82. Additionally, the illustrated carboxylate exchange reactor 74 is capable of heating the carboxylate exchange mixture 78 to provide temperatures ranging from approximately 20° C. to approximately 50° C. to facilitate the carboxylate exchange reaction and/or crystal growth. In certain embodiments, the citrate 76 may be a mixture of citric acid and sodium citrate, which may generally behave as a citrate buffer solution that maintains a low (acidic) pH (e.g., between approximately 3.4 and approximately 6.2) in the carboxylate exchange mixture 78. In certain embodiments, the pH of the carboxylate exchange mixture 78 may be controlled to provide either lead monocitrate (e.g., at relatively lower pH) or lead tricitrate (e.g., at relatively higher pH). In other embodiments, the lead citrate precipitate 82 formed in the carboxylate exchange mixture 78 may be a mixture of lead monocitrate and lead tricitrate. As illustrated in FIG. 2, the carboxylate exchange mixture 78 may subsequently be advanced to the next device (e.g., second phase separation device 80) in the illustrated lead recovery system 40.

The lead recovery system 40 illustrated in FIG. 2 includes a second phase separation device 80 that is configured to perform the acts described in block 20 of the process 10 illustrated in FIG. 1. In certain embodiments, the second phase separation device 80 may include a filter press, a clarifier, a cyclone separator, drying belts, spray dryers, a settling tank, or any other device or combination of devices capable of separating components of the carboxylate exchange mixture 78 based on particle size, solubility and/or density. As such, the second phase separation device 80 receives the carboxylate exchange mixture 78 and separates the solid lead citrate 82 from a liquid component 84 of the received carboxylate exchange mixture 78. As illustrated in FIG. 2, the second phase separation device 80 may receive a supply of wash water 81 to rinse the isolated solid lead citrate 82. In certain embodiments, the wash water 81 may have a particular temperature (e.g., 32° C.) in order to maximize the solubility of particular impurities (e.g., sodium sulfate) in the wash water 81. The liquid component 84 of the carboxylate mixture 78 isolated by the second phase separation device 80, which may include soluble sulfates (e.g., sodium sulfate, ammonium sulfate) and soluble acetates (e.g., sodium acetate, ammonium acetate), may then advance to the next device (e.g., an acetate recovery system 86) in the illustrated lead recovery system 40.

The acetate recovery system 86 generally receives the liquid component 84 of the carboxylate exchange mixture 78 that is isolated by the second phase separation device 80 and performs a number of processing steps to recover a substantial portion (e.g., some, a majority, or all) of the acetate 60 for reintroduction into the acetate leaching reactor 58. In certain embodiments, the treatment of the liquid component 84 may include acid treatment (e.g., with sulfuric acid recovered from processing spent lead-acid batteries), base treatment (e.g., hydroxide), phase separation, and/or distillation to recover the acetate 60 separately from one or more impurities (e.g., sulfates). As illustrated by the dashed line 83, in certain embodiments, a portion of the liquid component 84 of the carboxylate exchange mixture 78 may be recirculated back to the carboxylate exchange reactor 74 to facilitate further carboxylate (e.g., acetate-to-citrate) exchange. The solid lead citrate 82 isolated by the second phase separation device 80 may advance to the next device (e.g., electrowinning reactor 94) in the illustrated lead recovery system 40, as discussed below.

The lead recovery system 40 illustrated in FIG. 2 also includes a electrowinning reactor 94 that is configured to perform the acts described in blocks 22 and 24 of the process 10 illustrated in FIG. 1. As such, the electrowinning reactor 94 illustrated in FIG. 2 receives the solid lead citrate 82 isolated by the second phase separation device 80 and water 96, and dissolves the lead citrate 82 in the water 96 to generate an electrowinning mixture 98. In certain embodiments, the electrowinning reactor 94 may also be supplied with hydroxide, which can be used to increase the pH of the electrowinning mixture 98 above approximately 8 (e.g., to 8.5, 9, 9.5, 10, 10.5, 11, or more) to improve the solubility of the lead citrate within the electrowinning mixture 98. For such embodiments, the counter-ion to the hydroxide (e.g., sodium or potassium) may subsequently bind with the citrate in solution, generating a citrate salt (e.g., sodium or potassium citrate) in the lead-depleted electrowinning mixture 103 that exits the electrowinning reactor 94. In certain embodiments, the electrowinning mixture 98 may be a saturated or supersaturated aqueous solution of the second carboxylate (e.g., an aqueous lead citrate solution having excess solid lead citrate). By specific example, in certain embodiments, the electrowinning mixture 98 may include between approximately 70 grams and approximately 90 grams of lead citrate 82 per liter of the electrowinning mixture 98. In certain embodiments, the electrowinning reactor 94 may also be capable of mixing, mechanically stirring, agitation, and/or heating or cooling the electrowinning mixture 98 to facilitate the disclosed electrowinning process.

Further, as described in block 24 of FIG. 1, the electrowinning reactor 94 applies an electrical bias 100 to the electrowinning mixture 98 using a cathode and anode (e.g., graphite or lead electrodes) that are at least partially disposed in the electrowinning mixture 98. This electrical bias 100 drives the conversion of lead citrate 82 dissolved and/or suspended in the electrowinning mixture 98 into metallic lead 102 that collects on the anode. In certain embodiments, the electrical bias 100 may be approximately 3.5 volts (V), with a current between approximately 10 milliamps per square centimeter ($mA/cm^2$) and approximately 100 $mA/cm^2$, to generate the metallic lead 102. In general, the metallic lead 102 collected at the anode has a relatively spongy, dendritic structure having an exceptionally high purity, as demonstrated by E1 and E2 in Table 1 above. In certain embodiments, this metallic lead 102 may be post-processed (e.g., washed with water, remelted, pressed, cast into lead bullion, oxidized, alloyed, and/or otherwise chemically modified) to produce lead components for manufacturing, including lead components for manufacturing lead-acid batteries. By specific example, the metallic lead 102 may be oxidized (e.g., using a ball mill oxidation reactor) to form lead oxide useful for the manufacture of active materials for lead-acid batteries.

In certain embodiments, the lead recovery system 40 may include a citrate recovery system 106. The citrate recovery system 106 illustrated in FIG. 2 generally receives the lead-depleted electrowinning mixture 103 from the electrowinning reactor 94, which has been depleted in lead by the electrowinning process described above, and may perform a number of processing steps to separately recover a substantial portion (e.g., some, a majority, all) of the citrate 76 from the depleted mixture 103. For example, these processing steps may include the addition of an antisolvent (e.g., methanol), phase separation, solvent extraction, distillation, or other suitable processing steps. As illustrated in FIG. 2, the recovered citrate 76 may subsequently be fed back into the carboxylate exchange reactor 74, such that a substantial portion of the citrate 76 may be recycled within the lead recovery system 40.

Figure 3:
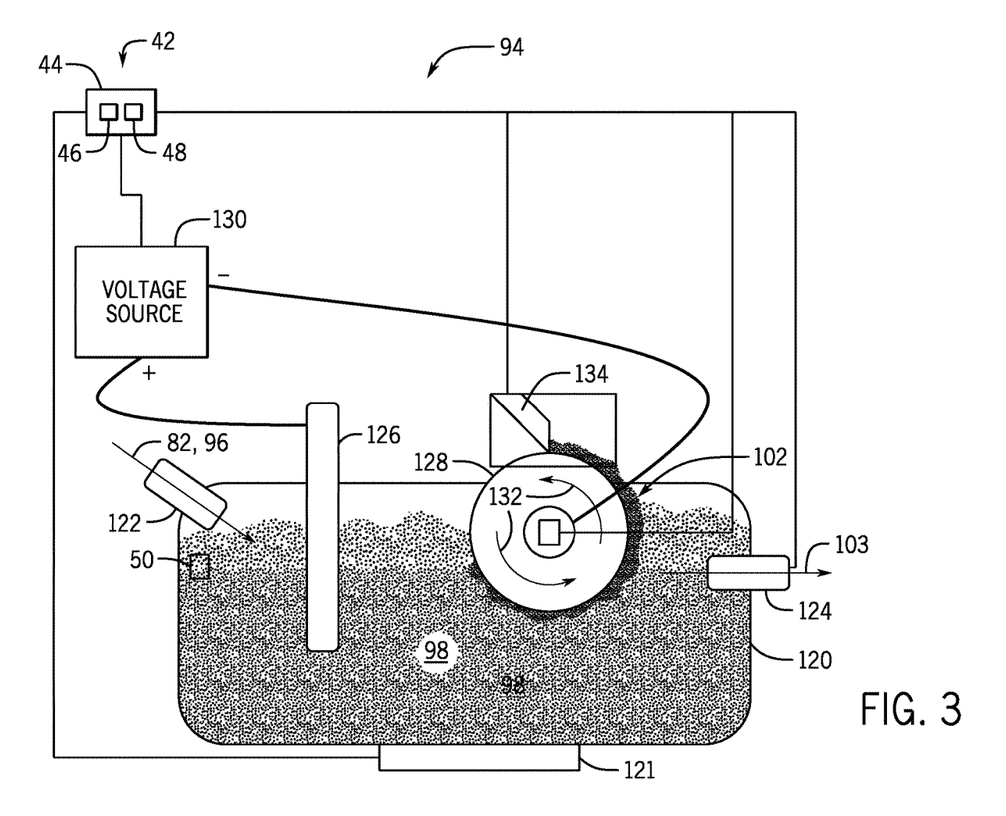
FIG. 3 is a schematic illustrating an example of an electrowinning reactor, in accordance with embodiments of the present approach.

FIG. 3 illustrates an embodiment of an electrowinning reactor 94 capable of continuous electrowinning of metallic lead 102 from an electrowinning mixture 98, in accordance with embodiments of the present technique. The illustrated electrowinning reactor 94 includes a vessel 120 having an inlet 122 that enables the introduction of the lead citrate 82 and water 96, which are combined within the vessel 120 to generate the electrowinning mixture 98. In certain embodiments, the lead citrate 82 and the water 96 may be mixed before being introduced into the vessel 120 of the electrowinning reactor 94. In other embodiments, the vessel 120 may include separate inlets for the lead citrate 82 and water 96, in accordance with the present disclosure. Additionally, the electrowinning reactor 94 may include a mechanical stirring system 121 to agitate the electrowinning mixture 98 to facilitate the dissolution of the lead citrate 82 and/or to limit concentration gradients within the electrowinning mixture 98 during the application of the electrical bias via the voltage source 130. It may be appreciated that, as the electrowinning process proceeds, the pH of the electrowinning mixture 98 will begin to decrease due to the accumulation of citric acid, which can undesirably result in the dissolution of metallic lead 102 from the surface of the anode 102 when the pH level of the electrowinning mixture 98 drops too low (e.g., pH less than 5). Accordingly, in certain embodiments, the electrowinning reactor 94 is capable of continuously receiving lead citrate 82 and water 96 via the inlet 122, continuously generating and collecting metallic lead 102, and continuously advancing the citric acid rich, lead-depleted electrowinning mixture 103 out of the vessel 120 (e.g., for recycling by the citrate recovery system 106 or for recirculation to the carboxylate exchange reactor 74) via the outlet 124, which prevents the accumulation of citric acid within the vessel 120 of the electrowinning reactor 94.

The illustrated electrowinning reactor 94 of FIG. 3 further includes a cathode 126 and an anode 128 that are partially disposed within the electrowinning mixture 98 to facilitate the electrowinning of metallic lead 102 from lead citrate 82 dissolved and/or suspended within the electrowinning mixture 98. The cathode 126 and anode 128 (e.g., lead or graphite electrodes) are coupled to a voltage source 130 capable of applying an electrical bias the cathode 126 and the anode 128 based on control signals received from the controller 44. As illustrated in FIG. 3, the anode 128 is designed to move (e.g., rotate or oscillate 132) during the electrowinning of metallic lead 102. As such, the anode 128, which may be referred to as a rotating wheel anode 128, is only partially disposed in the electrowinning mixture 98. As the electrical bias is applied between the cathode 126 and the anode 128, the $Pb^{2+}$ from the lead citrate 82 dissolved and/or suspended in the electrowinning mixture 98 is reduced to form metallic lead 102 that collects at the surface of the anode 128 that is disposed in the electrowinning mixture 98. As the rotating anode 128 continues to rotate 132, a portion of the rotating anode 128 emerges from the electrowinning mixture 98 and reaches a scraping mechanism 134 (e.g., a mounted blade), which scrapes and collects the metallic lead 102 from the surface of the rotating anode 128 in a continuous manner.

In certain embodiments, the controller 44 may monitor and control one or more operational parameters of the electrowinning reactor 94 to facilitate the electrowinning of the metallic lead 102. For example, in certain embodiments, the controller 44 receive information from the field device 50 of the electrowinning reaction 94 to monitor or control one or more of: a rate of addition of lead citrate 82, a rate of addition of water 96, a concentration of lead citrate in the electrowinning mixture 98, an amount of undissolved lead citrate 82 present in the electrowinning mixture 98, a rate of removal of the lead-depleted electrowinning mixture 103 via the outlet 124, the electrical bias/current applied to the electrowinning mixture 98, a rate of rotation 132 of the anode 128, an amount of pressure applied by the scraping mechanism 134, a rate of recovery of the metallic lead 102, a rate of mechanical stirring of the electrowinning mixture 98, a pH of the electrowinning mixture 98, a temperature of the electrowinning mixture 98, or a combination thereof, to control various aspects of the electrowinning process.

One or more of the disclosed embodiments, alone or in combination, may provide one or more technical effects useful in the recovery of lead from spent lead-acid batteries. Embodiments of the present approach enable the industrial scale continuous extraction and purification of lead from spent lead-acid batteries. Further, the disclosed electrowinning process, in particular, is especially appealing as it substantially avoids airborne particulates and noxious gases that are generated from other lead recovery methods. Accordingly, present embodiments enable continuous lead purification, are robust to the presence of a wide variety of impurities, and provide enhanced control over the parameters of the purification process. Additionally, present embodiments enable the electrowinning of metallic lead from a lead carboxylate solution, wherein the metallic lead has sufficiently high-purity for numerous applications, including semiconductor and lead-acid battery manufacturing. Further, present embodiments enable the recirculation and recycling of various reagents (e.g., acetate, citrate) during portions the lead recovery and purification process, which reduces both waste production and operational costs. The technical effects and technical problems in the specification are exemplary and are not limiting. It should be noted that the embodiments described in the specification may have other technical effects and can solve other technical problems.

While only certain features and embodiments of the disclosure have been specifically illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method, comprising:
   reacting a lead-bearing material with a first carboxylate source to generate a first lead carboxylate;
   reacting the first lead carboxylate with a second carboxylate source to generate a second lead carboxylate; and
   applying an electrical bias to an aqueous solution of the second lead carboxylate to generate metallic lead.

2. The method of claim 1, wherein the first carboxylate source comprises an acetate and the second carboxylate source comprises a citrate.

3. The method of claim 1, comprising processing spent lead-acid batteries to generate the lead-bearing material, wherein the lead bearing material comprises grids, posts, interconnects, plates, spines, battery paste, lead oxides, or lead sulfates, or combinations thereof, extracted from the processed spent lead-acid batteries.

4. The method of claim 1, wherein the first lead carboxylate is generated in a leaching mixture, and wherein the generated first lead carboxylate is dissolved in a liquid component of the leaching mixture.

5. The method of claim 1, wherein the second lead carboxylate is generated in a carboxylate exchange mixture that includes the second carboxylate source, and wherein the second lead carboxylate precipitates from the carboxylate exchange mixture.

6. The method of claim 5, comprising isolating the second lead carboxylate from the carboxylate exchange mixture, and dissolving and/or suspending the second lead carboxylate in water to generate the aqueous solution of the second lead carboxylate.

7. The method of claim 1, wherein applying the electrical bias comprises applying a voltage of approximately 3.5 volts (V) and a current between approximately 10 milliamps per square centimeter ($mA/cm^2$) and approximately 100 $mA/cm^2$ to the cathode and anode to generate the metallic lead.

8. The method of claim 1, comprising processing the metallic lead to manufacture a component of a lead-acid battery, and then manufacturing the lead-acid battery using the component.

9. A method, comprising:
   processing spent lead-acid batteries to generate a lead-bearing material;
   leaching the lead-bearing material using a first carboxylate source to generate a leaching mixture, wherein the leaching mixture includes a dissolved first lead carboxylate;
   separating unleached solids from a liquid component of the leaching mixture;
   mixing the liquid component of the leaching mixture with a second carboxylate source to generate a carboxylate exchange mixture, wherein the carboxylate exchange mixture includes solid particles of a second lead carboxylate;
   separating the solid particles of the second lead carboxylate from a liquid component of the carboxylate exchange mixture;
   generating an aqueous solution from the solid particles of the second lead carboxylate; and
   applying an electrical bias to the aqueous solution of the second lead carboxylate to generate metallic lead.

10. The method of claim 9, wherein the leaching mixture comprises hydroxide and a peroxide to facilitate the leaching of the lead-bearing material.

11. The method of claim 9, comprising treating the liquid component of the carboxylate exchange mixture to regenerate a portion of the first carboxylate source, and then recycling this portion of the first carboxylate source back to generate the leaching mixture.

12. The method of claim 9, comprising treating the liquid component of the aqueous solution after applying the electrical bias to regenerate a portion of the second carboxylate source, and then recycling this portion of the second carboxylate source back to generate the carboxylate exchange mixture.

13. The method of claim 9, wherein the aqueous solution of the second lead carboxylate is a supersaturated solution.

14. The method of claim 9, wherein the electrical bias is applied using a lead anode, wherein the metallic lead is generated at the surface of the lead anode.

15. The method of claim 9, comprising alloying one or more metals with the metallic lead to generate a lead alloy, and then using the lead alloy to manufacture a component of a lead-acid battery.

16. The method of claim 9, comprising oxidizing the metallic lead to generate lead oxide, and then using the lead oxide to manufacture an active material of a lead-acid battery.

17. The method of claim 9, wherein the aqueous solution is supersaturated in the second lead carboxylate such that a portion of the second lead carboxylate in the aqueous solution remains undissolved.

18. The method of claim 9, comprising adding hydroxide to the aqueous solution of the second lead carboxylate increase a pH of the aqueous solution to 8 or more before applying the electrical bias, wherein the increased pH increases the solubility of the second lead carboxylate in the aqueous solution.

19. The method of claim 1, wherein reacting the lead-bearing material with the first carboxylate source comprises leaching the lead-bearing material using the first carboxylate source to generate a leaching mixture having the first lead carboxylate dissolved therein.

20. The method of claim 19, comprising separating unleached solids from a liquid component of the leaching mixture, wherein the first lead carboxylate remains dissolved in the liquid component of the leaching mixture after separating.

21. The method of claim 20, wherein reacting the first lead carboxylate with the second carboxylate source comprises mixing the separated liquid component of the leaching mixture having the first lead carboxylate dissolved therein with the second carboxylate source to generate a carboxylate exchange mixture, wherein the carboxylate exchange mixture includes solid particles of the second lead carboxylate.

22. The method of claim 21, comprising:
separating the solid particles of the second lead carboxylate from a liquid component of the carboxylate exchange mixture; and
generating the aqueous solution of the second lead carboxylate from the separated solid particles of the second lead carboxylate.

* * * * *

UNITED STATES PATENT AND TRADEMARK OFFICE
CERTIFICATE OF CORRECTION

PATENT NO. : 10,062,933 B2
APPLICATION NO. : 15/145256
DATED : August 28, 2018
INVENTOR(S) : Matthew A. Spence Page 1 of 1

It is certified that error appears in the above-identified patent and that said Letters Patent is hereby corrected as shown below:

In the Specification

In Column 1, Line 28, delete "purposes" and insert -- purposes. --, therefor.

In Column 2, Line 44, delete "DRAWINGS" and insert -- BRIEF DESCRIPTION OF DRAWINGS --, therefor.

In Column 3, Line 19, delete "tartarate," and insert -- tartrate, --, therefor.

In Column 10, Line 48, delete "a electrowinning" and insert -- an electrowinning --, therefor.

In Column 12, Line 5, delete "anode 102" and insert -- anode 128 --, therefor.

Signed and Sealed this
Eleventh Day of December, 2018

Andrei Iancu
*Director of the United States Patent and Trademark Office*